Figure 1:
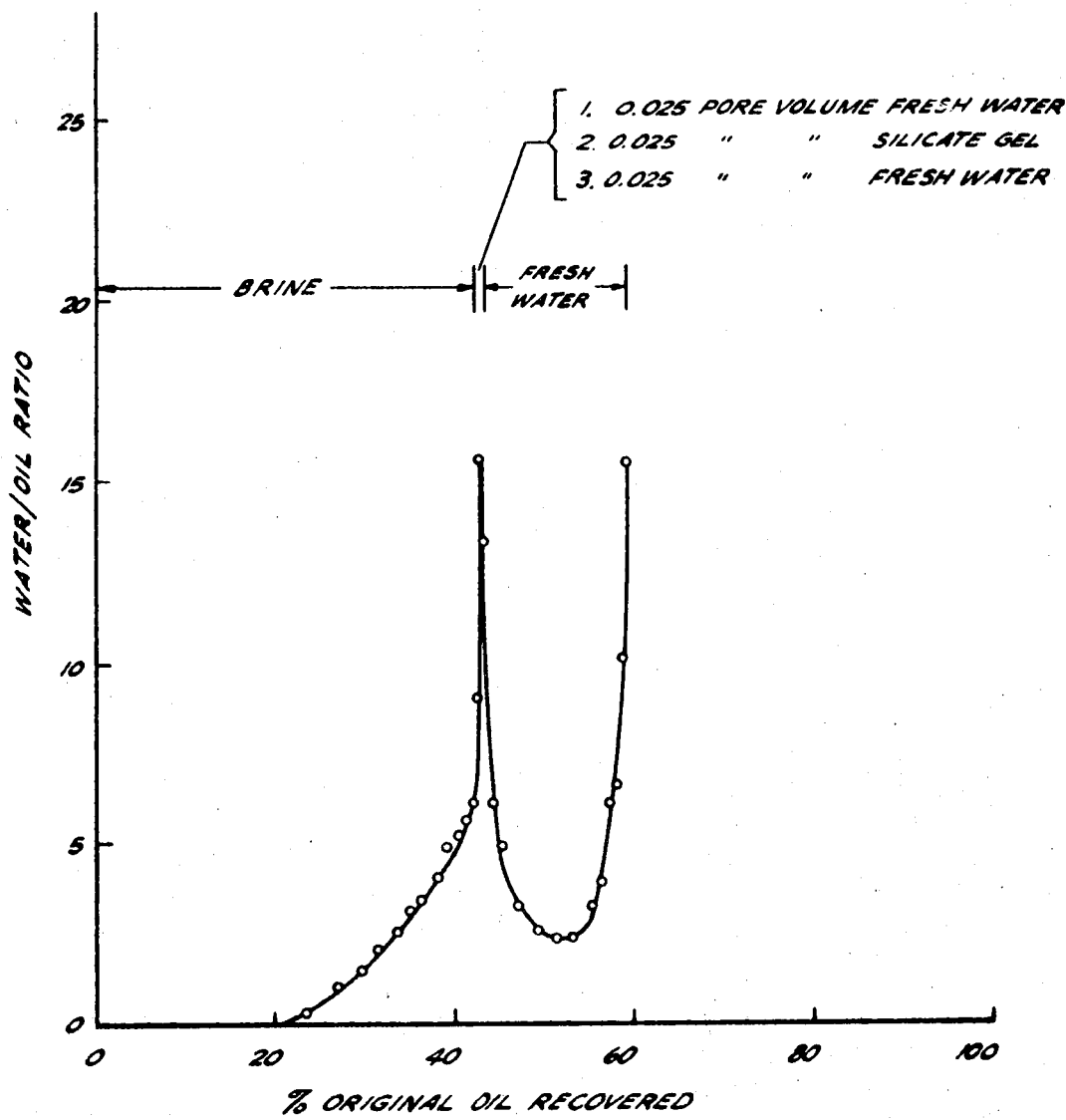

ns S. Henderson, Dean Sandford and Robert E. Strauss

United States Patent

Sandiford et al.

[11] 3,741,307
[45] June 26, 1973

[54] OIL RECOVERY METHOD

[75] Inventors: Burton B. Sandiford, Placentia; Robert K. Knight, Fullerton, both of Calif.

[73] Assignee: Union Oil Company of California, Los Angeles, Calif.

[22] Filed: Mar. 9, 1971

[21] Appl. No.: 122,336

[52] U.S. Cl................... 166/273, 166/292, 166/300
[51] Int. Cl............................................. E21b 43/16
[58] Field of Search.................... 166/273, 270, 292, 166/285, 293, 300

[56] References Cited
UNITED STATES PATENTS

| 3,530,937 | 9/1970 | Bernard | 166/270 |
|---|---|---|---|
| 3,352,358 | 11/1967 | Williams | 166/273 |
| 2,238,930 | 4/1941 | Chamberlain | 166/292 |
| 3,396,790 | 8/1968 | Eaton | 166/273 X |
| 3,566,967 | 3/1971 | Shelton | 166/261 |
| 2,747,670 | 5/1956 | King | 166/292 X |

Primary Examiner—Robert L. Wolfe
Attorney—Milton W. Lee, Richard C. Hartman, Lannas S. Henderson, Dean Sandford and Robert E. Strauss

[57] ABSTRACT

A method for treating heterogeneous petroleum reservoirs to reduce channeling of subsequently injected flooding media is disclosed wherein an aqueous polymer solution is injected into the reservoir through an injection well in an amount sufficient to penetrate into the more permeable strata of the reservoir a substantial distance from the injection well, then a liquid agent that reacts in the reservoir to form or deposit a plugging material that reduces the permeability of the formation is injected through the injection well and into the formation immediately surrounding the well so as to selectively plug the more permeable strata adjacent to the injection well. Channeling of subsequently injected flooding media is reduced, resulting in more uniform flood patterns and higher sweep efficiencies and an attendant increase in oil recovery.

16 Claims, 2 Drawing Figures

OIL RECOVERY METHOD

This invention relates to the recovery of oil from subterranean petroleum reservoirs of varying permeability, and more particularly to a method for recovering oil from heterogeneous reservoirs by flooding processes.

Since only a portion of the oil contained in a petroleum reservoir can be recovered by primary methods, it has become conventional practice to employ various secondary and tertiary recovery techniques to produce additional quantities of oil not economically recoverable by primary methods. Of the various secondary and tertiary recovery methods available, one of the most widely practiced techniques is the displacement of oil from the reservoir with a driving fluid such as flood water injected for that purpose. Normally, in carrying out the flooding process, a series of input wells spaced apart from one or more producing wells are drilled into and opened to the oil-producing strata. The injection well locations with reference to the production wells are selected to afford a desired flood pattern, the selected pattern depending in part upon field conditions, the location of existing wells, and the operator's preference. Aqueous drive fluid, such as water, brine, or a viscous aqueous polymer solution, is forced into the input wells under pressure, and out into the surrounding oil-bearing strata towards the producing well or wells. While waterflooding has been rather widely practiced in recent years, it is not without considerable operating problems and economic limitations, particularly those associated with low oil recoveries in proportion to the amount of water injected. Various surfactant and solvent floods have been proposed as means for recovering additional quantities of oil over that recoverable by conventional waterflooding. However, these processes face serious operating problems when practiced in heterogeneous formations containing strata or channels having permeabilities substantially higher than the bulk of the formation.

One of the major problems encountered in a flooding operation is breakthrough of the flooding medium from the flood front to the producing well relatively early in the displacement process, and rapidly increasing producing water/oil ratios following the initial breakthrough. These difficulties result from the displacing medium channeling or fingering through the oil-bearing structure to the producing well, thus bypassing large zones of the oil-bearing strata. The reason for the channeling of the flooding medium to the producing wells and the resulting low oil recovery is due, in part, to the peculiar structure of the oil-bearing strata. Underground oil reservoirs, in most cases, consist of layers of sand or rock and, since no reservoir rock is perfectly uniform in composition and structure, the permeability will vary across the rock face or stratum. Also, fractures, cracks, vugs and other anomalies can promote channeling of the displacement fluid.

In the normal flooding operation, maximum oil recovery is obtained when the driven fluid builds up in a wide bank in front of the driving fluid which moves uniformly towards the producing well. To keep this bank of oil intact, and constantly moving towards the producing well, a substantially uniform permeability must exist throughout the strata. If this uniform permeability does not exist, or is not provided, the flooding fluid will seek the areas of high permeability, and channeling occurs with the consequent loss of some driving fluid energy and the appearance of excessive amounts of driving fluid in the producing wells. Moreover, as the more permeable strata are depleted, the driving fluid has a tendency to follow channels and further increase consumption of the flooding media to the point where the process becomes uneconomical. This maximum limit, in terms of recovered oil, can be as high as 100 barrels of driving fluid per barrel of oil. It is of course desirable to operate at much lower driving fluid to oil ratios, and preferably not more than 15, and normally a maximum of 5 to 10 barrels of driving fluid per barrel of recovered oil is considered an acceptable operating condition, particularly where the driving fluid is a low cost agent such as flood water.

While a uniform flood front with reduced fingering can be obtained in some formations with a drive fluid rendered more viscous by the addition of various water-soluble polymers, or other materials capable of imparting higher viscosity to the floodwater, viscous waterflooding is often ineffective in formations having severe heterogeniety as the mobility of the flood water cannot be economically reduced sufficiently to prevent or substantially restrict channeling of the flooding medium. Also, smaller volumes of aqueous polymer solution are sometimes injected into a heterogeneous reservoir to divert subsequently injected flooding media into the less permeable strata. However, such treatments are often ineffective or only partially effective in highly stratified formations.

Where a heterogeneous formation is flooded, it is usually found that the flood water or other flooding medium introduced into the injection well will enter the various strata open to the well at different flow rates depending upon the permeability of the individual strata relative to the permeabilities of the other strata in the formation. A water injection well of this type is said to exhibit a nonuniform injection profile. Heretofore, it has been considered that nonuniform injection profiles were symptomatic of channeling and the resulting poor flood water conformance. Accordingly, it was believed that selective plugging or other treatment to improve or correct the injection profile would ameliorate channeling and result in improved flood water conformance and increased oil recovery. However, most commercially practical selective plugging treatments effect the permeability of the strata only at the well face or for a few feet distance from the well. Since adjacent strata are often in fluid communication throughout all or a substantial part of the formation subjected to flooding, cross flow between the various strata exists and severe channeling develops even though a substantially uniform injection profile is obtained. Thus, in many applications, treatment of the injection wells to improve the water injection profiles has no demonstrable effect on oil recovery. Hence, need exists for an improved flooding process for use in heterogeneous formations that will minimize channeling of the flooding medium or bypassing of large areas of the formation, or for a method for improving the effectiveness of the conventional selective plugging processes to obtain these goals.

Accordingly, a principal object of this invention is to provide an improved flooding process for recovering oil from heterogeneous petroleum reservoirs.

Another object of the invention is to provide an improved waterflooding process for recovering oil from reservoirs having strata of widely varying permeabilities.

Still another object of the invention is to provide a method for reducing channeling of flooding medium from an injection well to a producing well in a flooding process.

A further object of the invention is to provide a water-flooding process for recovering increased quantities of oil from heterogeneous petroleum reservoirs.

A still further object of the invention is to provide an improved selective plugging process for reducing the channeling of flooding medium from the injection wells to the producing wells of a reservoir subjected to a flooding operation.

Figure 2:
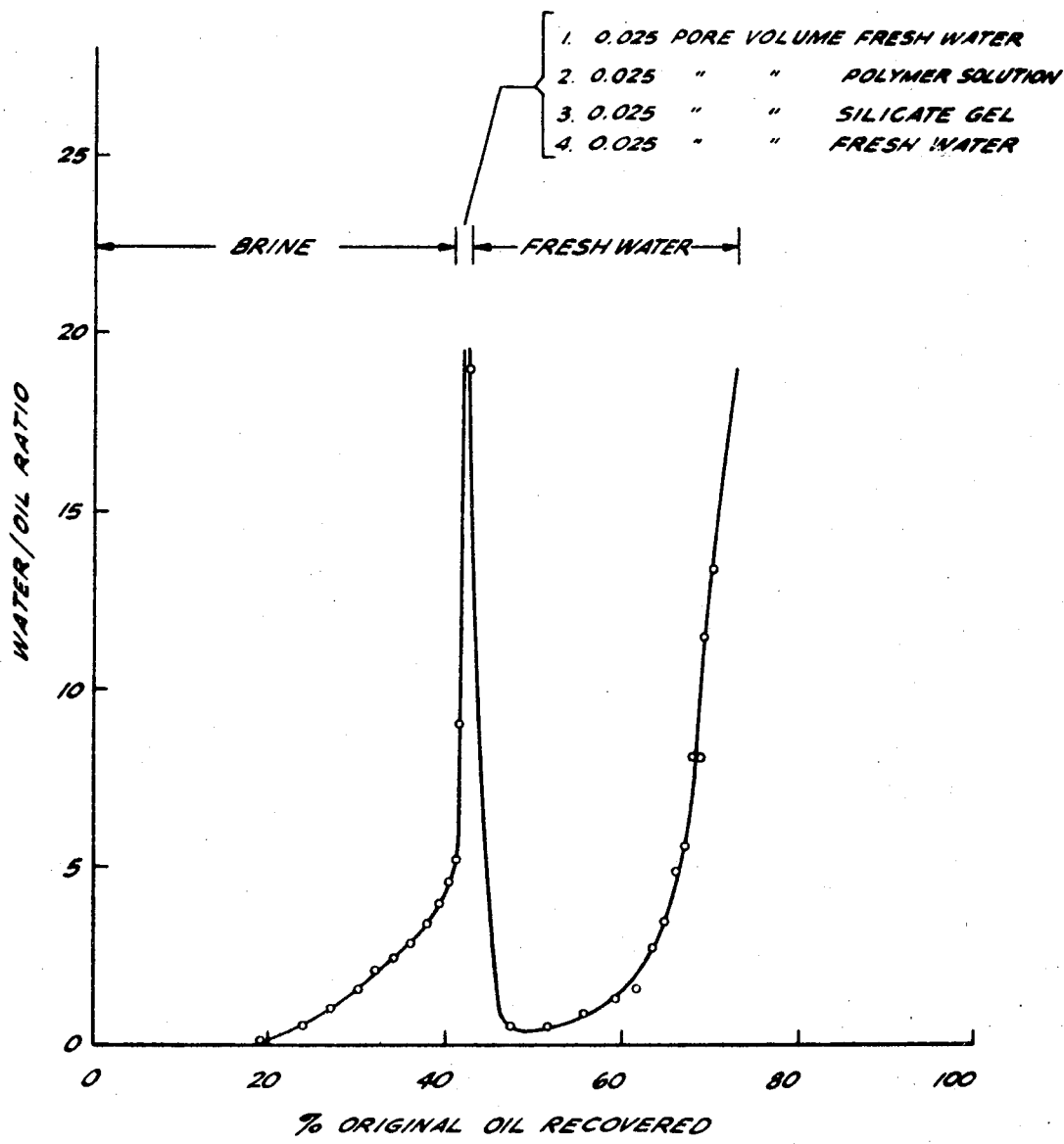

Other objects and advantages of the invention will be apparent from the following description and the accompanying drawings, in which:

FIG. 1 is a graph depicting the variation in the produced water/oil ratio as a function of oil recovery in the exemplary waterflooding process of Example 1 employing conventional selective plugging; and FIG. 2 is a graph depicting the variation in the produced water/oil ratio as a function of oil recovery in the exemplary waterflooding process of Example 2 employing the method of this invention.

Briefly, this invention contemplates a process for recovering oil from heterogeneous subterranean reservoirs having highly permeable channels communicating the injection and production wells in which an aqueous solution of a water-soluble polymer is injected into the reservoir through an injection well in an amount sufficient to penetrate into the more permeable strata a substantial distance from the injection well, then an agent that reacts in the reservoir to reduce the permeability of the formation to water is injected through the injection well and into the formation immediately surrounding the well so as to selectively plug the more permeable strata adjacent the injection well, and thereafter a flooding medium is injected through the injection well to drive oil towards one or more spaced production wells. It has been found that this particular sequence of polymer solution injection and selective plugging reduces the channeling of the subsequently injected flooding medium and results in the recovery of more oil than can be obtained by the flooding process alone, or flooding combined with conventional selective plugging.

More specifically, this invention involves a process for reducing channeling of flooding medium from an injection well to a production well. Channeling is reduced and more uniform flood patterns are obtained by injecting a relatively dilute aqueous solution of a water-soluble polymer into the reservoir through one or more injection wells in fluid communication with the reservoir. The aqueous polymer solution enters the various strata of the formation open to the injection well in proportion to the water permeability of the strata, i.e., the initial rate of flow of polymer solution into the various strata per vertical foot of strata open to the well is highest in the most permeable strata and lowest in the least permeable strata. This distribution of polymer solution, which has a substantially lower mobility than water, tends to divert subsequently injected fluids so that a more uniform distribution is obtained. Also, at flow rates encountered in the reservoir, it is known that the mobility reducing properties of polymer solution are greatest in the strata of highest permeability, which further tends to effect distribution of subsequently injected fluids. However, in highly stratified formations having one or more strata of substantially higher permeability than the other strata, the bulk of the polymer solution enters the high permeability strata with little or no polymer solution entering the low permeability strata and the mobility reducing capability of the polymer solution is not sufficient to cause the diversion of any substantial amount of polymer solution to the lower permeability strata. Thus, in the practice of this invention, at least sufficient polymer solution is injected to penetrate into the more permeable strata a substantial distance from the injection well, although this quantity of polymer solution may not of itself be capable of effecting substantial diversion of subsequently injected fluids.

Following the injection of the aqueous polymer solution, a relatively small quantity of a liquid agent that chemically reacts or otherwise acts in the reservoir to selectively reduce the permeability of the reservoir is injected through the injection well and into the formation immediately surrounding the well so as to selectively plug the more permeable strata adjacent to the injection well to reduce the permeability of these strata to the subsequently injected flooding medium. As in the case of the polymer solution, the selective plugging agent tends to preferentially enter the more permeable strata open to the injection well, and the rate of flow of selective plugging agent into the various strata per vertical foot of strata open to the well, or total quantity of selective plugging agent entering each strata, is proportional to the permeability of the individual stratum relative to the permeabilities of the other strata. Thus, the more permeable strata or channels tend to receive the bulk of the selective plugging agent. The amount of selective plugging agent introduced into the well is controlled so that the liquid plugging agent penetrates into the more permeable strata or channels only a relatively short distance from the well whereupon the agent reacts in the reservoir to form a plugging material that restricts or prevents the flow of subsequently injected flooding medium from the injection well into the more permeable strata or channels open to the injection well.

While the method of this invention is particularly adapted for recovery of oil from heterogeneous reservoirs; as a practical matter, most petroleum reservoirs exhibit some heterogeneity, and thus oil recoveries are improved in most naturally occurring petroleum reservoirs by treatment with the process of this invention. By heterogeneity, it is meant that the reservoir is comprised of stratified layers of varying permeability, or that it contains fractures, cracks, fissures, streaks, vuggs, or zones of varying permeability that cause an injected flooding medium to advance through the reservoir nonuniformly. Thus, the formations that are particularly amenable to treatment by the method of this invention are those formations that have strata or zones of different permeabilities, or which otherwise are structurally faulted so that the injected flooding media do not advance through the formation at a substantially uniform rate along the entire flood front. Volumetric sweep efficiency is improved and oil recoveries increased as the miscible flood front is rendered more uniform. The term "volumetric sweep efficiency" as used herein is defined as the product of the horizontal and vertical sweep efficiencies.

The viscous aqueous polymer solution employed in the first stage of the treatment of this invention is a dilute solution of a water-soluble polymer in fresh water or brine. A number of water-soluble polymers are known to decrease the mobility of water in porous media when dissolved therein in relatively dilute concentrations. Exemplary water-soluble polymeric materials that can be employed are relatively high molecular weight acrylic acid-acrylamide copolymers, acrylic acid-acrylamide-diacetone acrylamide terpolymers, partially hydrolyzed polyacrylamides, hydroxyethyl cellulose, carboxymethyl cellulose, polyacrylamides, polyoxyethylenes, modified starches, heteropolysaccharide obtained by the fermentation of starch derived sugar, polyvinyl alcohol, polyvinyl pyrollidone, and polystyrene sulfonates.

Many of the water-soluble polymers useful in the practice of this invention are characterized by a viscosity of at least 3 centipoises for a 0.1 percent by weight solution thereof in aqueous 3 percent by weight sodium chloride solution at 25° C. as determined with a Brookfield viscosimeter equipped with a UL adapter and operated at a speed of 6 rpm. However, it is to be recognized that other of the water-soluble polymers are effective in reducing the mobility of water in porous media, yet have little or only slight effect upon the viscosity of water.

A preferred water-soluble polymer useful as the mobility reducing agent in the first-stage injection is particularly hydrolyzed polyacrylamide having between about 2 to about 67 percent of the carboxamide groups hydrolyzed to carboxyl groups, and which is characterized by a molecular weight of at least 500,000 and preferably 1,000,000 or more. Another preferred polymer having the desired, viscosity increasing properties is acrylic acid-acrylamide copolymer of similar molecular weight. Still another preferred viscosity increasing agent is acrylic acid-acrylamide-diacetone acrylamide terpolymer.

The water-soluble polymers useful in this invention are inclusive of the polymers wherein the carboxyl groups are in the acid form and also such polymers wherein the carboxyl groups are in the salt form, provided that the salts are water-soluble. Thus, for example, the polymers can be employed in the form of the carboxylates of sodium, potassium, other alkali metal, or ammonium, or in the form of the mixed carboxylates of sodium, potassium, magnesium, calcium, and the like.

The selected water-soluble polymer is admixed with water or brine to provide a relatively dilute aqueous solution of the polymer that exhibits a sufficiently reduced mobility when injected into the porous media to divert subsequently injected fluids to the less permeable channels. Preferably, the polymer is dissolved in fresh water since the mobility reduction effect of most of these polymers is inhibited by the presence of substantial quantities of dissolved salts. However, it is sometimes desirable to employ oil-field brine or other water containing relatively high dissolved salt contents, particularly where the formation into which they are to be injected is water-sensitive or where fresh water is not available. In most instances, the mobility of the water can be reduced to the desired level by the addition of 0.001 to 1 weight percent of the polymer, and satisfactory results can often be obtained by the addition of 0.05 to 0.15 weight percent polymer.

Any of a wide variety of known selective plugging agents can be employed in the second stage of the treatment of this invention. These agents are injected in liquid form, i.e., the plugging agent is a liquid, or is dissolved or dispersed in a liquid, so that when pumped into the well it will enter into at least the more permeable strata open to the well whereupon it then reacts to form a plugging material. Useful selective plugging agents include chemical agents that react with the reservoir rock or with the reservoir or injected fluids to form a precipitate or plugging deposit in the reservoir, exemplary of which are alkali metal hydroxides, sodium silicate, and the like; two or more reactive chemical agents injected successively, such as various water-soluble salts of iron, aluminum, calcium, cobalt, nickel, copper, mercury, silver, lead, chromium, zinc, cadmium, and magnesium which form a precipitate with separately injected aqueous solutions of sodium hydroxide, sodium carbonate, sodium, borate, sodium bicarbonate, sodium silicate, sodium phosphate, or the potassium or ammonium salts of these anions; various polymeric materials that form substantially permanent plugging deposits in the reservoir, such as cross-linked polyacrylamide; and reactive agents wherein the gelation or precipitation is delayed until the agent is placed in the reservoir, such as hydraulic cements and delayed acting silica gels.

Any of a wide variety of known selective plugging agents can be employed in the second stage of the treatment of this invention. These agents are injected in liquid form, i.e., the plugging agent is a liquid, or is dissolved or dispersed in a liquid, so that when pumped into the well it will enter into at least the more permeable strata open to the well whereupon it then reacts to form a plugging material. Useful selective plugging agents include chemical agents that react with the reservoir rock or with the reservoir or injected fluids to form a precipitate or plugging deposit in the reservoir, exemplary of which are alkali metal hydroxides, sodium silicate, and the like; two or more reactive chemical agents injected successively, such as various water-soluble salts of iron, aluminum, calcium, cobalt, nickel, copper, mercury, silver, lead, chromium, zinc, cadmium and magnesium which form a precipate with separately injected aqueous solutions of sodium hydroxide, sodium carbonate, sodium borate, sodium bicarbonate, sodium silicate, sodium phosphate, or the potassium or ammonium salts of these anions; various polymeric materials that form substantially permanent plugging deposits in the reservoir, such as cross-linked polyacrylamide; and reactive agents wherein the gelation or precipitation is delayed until the agent is placed in the reservoir, such as hydraulic cements and delayed acting silica gels.

A preferred selective plugging agent is an aqueous solution of sodium silicate and a gelling agent such as an acid or an acid forming compound, a water-soluble ammonium salt, a lower aldehyde, an aluminum salt, or an alkali metal aluminate. Exemplary gelling agents are sulfuric acid, hydrochloric acid, ammonium sulfate, formaldehyde, aluminum sulfate and sodium aluminate. The sodium silicate reacts in the presence of the gelling agent to form a silica or silica alumina gel. It is well known that the gelling of sodium silicate in the presence of these gelling agents is delayed, i.e., gelling occurs at some time after the sodium silicate and gelling agent are admixed, and under some conditions gelling is delayed for up to seven days. It is preferred that the conditions be selected in accordance with known techniques to delay gelling of the sodium silicate for a period sufficient to permit its injection into the reservoir immediately adjacent the well, but yet not for a period that would unduly prevent continuance of the flooding operation. Thus, in most cases it is preferred that the conditions be selected so that gelling is delayed for about one day, and is substantially completed within about 7 days.

The concentration of sodium silicate in the plugging solution can vary over a wide range, e.g., from about 1 to 30 weight percent. However, weaker plugs are formed at the more dilute concentrations and costs are often excessive at higher concentrations. Thus, it is preferred that the sodium silicate concentration of the plugging solution injected into the formation be between about 3 and 15 weight percent, and preferably between about 3 and 10 weight percent. The ratio of silica to sodium oxide ($SiO_2/Na_2O$) in the silicate can also vary within limits from about 1.5 to 1 to about 4 to 1 by weight. Preferably, however, the ratio should be from about 3 to 1 to about 3.5 to 1, i.e., if it is preferred that the sodium silicate solution contain 3 to 3.5 parts by weight of silica ($SiO_2$) per part of sodium oxide ($Na_2O$).

Thus, it is apparent that any of a wide variety of setable liquids can be employed as the selective plugging agent injected in the second stage of the process of this invention, it being required only that they act in the reservoir to form solids or gels that substantially reduce the permeability of the more permeable strata of the formation to the subsequently injected flooding media.

In the practice of the treating method of this invention, there is first introduced into a heterogeneous or highly stratified reservoir a quantity of the aqueous polymer solution sufficient to penetrate into the more permeable strata of the reservoir a substantial distance from the injection well. It is preferred that the aqueous solution penetrate into the more permeable strata a distance of at least about 20 feet from the injection well, and more preferably a distance of about 50 feet, although it is recognized that in some cases sufficient polymer solution can be injected to pass through the formation to one or more spaced production wells, which can be located several hundred feet or more from the injection well. It should be understood that the polymer solution will penetrate into the less permeable zones to a much lesser extent, the amount of polymer solution entering each stratum depending upon the permeability of the individual stratum in relation to the permeabilities of all the strata.

The amount of polymer solution required to obtain the desired treatment will vary from well to well and can best be determined from a knowledge of the reservoir characteristics obtained from well logs, core analysis, injection profiles and tracer studies. Nevertheless, it is found that satisfactory results can often be obtained by the injection of about 5 to 200 barrels of polymer solution per vertical foot of formation to be treated.

The injection of the polymer solution is followed by the second-stage injection involving the injection of the selective plugging agent into the more permeable strata of the reservoir immediately adjacent to the injection well. In this step, a quantity of the selective plugging agent sufficient to penetrate the more permeable strata of the reservoir immediately surrounding the injection well is injected through the injection well and into the reservoir. Preferably, the selective plugging agent penetrates into the more permeable strata a distance of not more than about 10 feet from the injection well, and more preferably not more than about 5 feet. At the conclusion of this injection, the well is usually shut in for a sufficient period to allow the selective plugging agent to substantially completely react to form the plugging material, whereupon injection of the flooding media can then be initiated.

As in the case of the first stage treatment, the amount of selective plugging agent required in any well treatment is best determined from a knowledge of the characteristics of the particular reservoir to be treated. However, the desired treatment can often be obtained by injecting about 1 to 10 barrels of selective plugging agent per vertical foot of interval to be treated.

The flooding operation conducted following the treatment of this invention is practiced in conventional manner with conventional flooding agents. Accordingly, the flooding media can be water, brine, or a dilute aqueous solution of a water-soluble polymer exhibiting a viscosity greater than that of the water or brine; the flooding media being injected through one or more injection wells to displace oil towards one or more spaced production wells. Also, the flooding media can comprise an alcohol, such as isopropyl alcohol, carbon dioxide, carbonated water, an aqueous or oil-base surfactant solution, an emulsion, a substantially anhydrous soluble oil, a water-in-oil microemulsion, a micellar dispersion, or the like, either injected as the entire flooding medium or in the form of a slug injection wherein one or more relatively small volumes of these agents are injected into the reservoir and followed by the injection of an aqueous drive fluid such as floodwater, brine, or aqueous polymer solution.

Also, it is sometimes advantageous, particularly, where the reservoir water is a brine, or brine is subsequently injected as the flooding media, to precede the injection of the polymer solution by the injection of a small volume of fresh water, and to follow the selective plugging agent with another small volume of fresh water to insulate or isolate the first and second stage treatments from contact with brine. In the usual application, an injection of 1 to 10 barrels of fresh water in each slug per vertical foot of interval to be treated is adequate, however the exact volume of water injected in this step is not usually critical.

In those applications where it is desired to practice the treatment of this invention in conjunction with a viscous water-flood, i.e., where an aqueous polymer solution is being injected into the reservoir, it is often possible to delete the first stage injection and proceed directly with injection of the selective plugging agent, the prior injected aqueous polymer solution having been sufficient to penetrate into the more permeable strata to a substantial distance from the well bore. However, in those instances in which the aqueous polymer solution is particularly dilute, i.e., where only a small mobility reduction is imparted to the flood water, or where the effectiveness of the polymer has been damaged, it is advantageous to proceed with both first and second stage treatments.

Accordingly, in a preferred mode of practicing this invention, the formation characteristics and prior operations are studied to determine the extent of treatment required. Also, it is often desirable to conduct tracer studies to assist in this determination. Then a small slug of fresh water, usually amounting to between about 5 to 10 barrels per vertical foot of interval to be treated, is injected through the injection well and into the reservoir. Next there is injected through the injection well a sufficient amount of aqueous polymer solution to penetrate into the most permeable strata a distance of at least about 20 feet from the injection well, and more preferably to a distance of about 50 feet from the injection well. Thereafter, a delayed acting selective plugging material is injected though the injection well and into the reservoir in an amount sufficient to penetrate into the more permeable strata of the reservoir not more than about 10 feet from the injection well, and preferably not more than about 5 feet therefrom. The well is shut in for the period of time necessary for the setting action of selective plugging agent to be substantially complete. Thereafter, a flooding operation is conducted in conventional manner.

It has been found that the combination treatment of this invention wherein an aqueous polymer solution is first injected into the more permeable channels of a heterogeneous reservoir and thereafter a conventional selective plugging treatment is conducted in the reservoir adjacent to the injection well substantially reduces channeling of subsequently injected flooding media, promotes a more uniform flood front, and substantially increases the recovery of oil from heterogeneous reservoir.

After treatment of a heterogeneous reservoir in accordance with the method of this invention and the subsequent injection of flooding media, it is sometimes found at later stages of the flooding process that channeling of the flooding media again becomes a problem. Also, occasionally, a single treatment may not control channeling to a desired degree. Thus, it is within the scope of this invention to repeat the aforedescribed treatment at spaced intervals to provide a plurality of plugging treatments.

The invention is further described by the following examples which are illustrative of specific modes of practicing the invention and are not intended as limiting the scope of the invention as defined by the appended claims.

EXAMPLE 1

This example illustrates the oil recovery obtainable by a conventional treatment to selectively plug the more permeable strata of a heterogeneous oil-bearing porous formation subjected to water flooding. A four layer synthetic Aloxite core 4-inches square by 2-inches thick is used to simulate a heterogeneous stratified oil-bearing formation. The core consists of four layers of porous aluminum oxide approximately ½-inch thick bonded together. Each layer has a different permeability, individual layers exhibiting permeabilities of about 1, 2, 3 and 50 darcies, respectively. An injection well at one corner of the core is in fluid communication with each of the individual layers and a production well in a diagonally opposed corner of the core is also in fluid communication with each of the layers. Also, each of the porous layers is in fluid communication with the next adjacent layers over the entire strata interface. Thus, this model represents a highly stratified heterogeneous earth formation penetrated by an injection well and a spaced production well.

The core is prepared by first saturating it with oilfield brine and then with a 39° API Illinois crude oil. Oil saturation is 73.6 percent. The core is flooded with brine until substantial water breakthrough is observed as evidenced by a sharp increase in the produced water/oil ratio. The produced oil and water are collected and measured. Oil recovery at a produced water/oil ratio of 15 is 42.5 volume percent of the original oil-in-place.

A conventional selective plugging treatment is then performed by injecting through the injection well 0.025 pore volume of fresh water followed by 0.025 pore volume of delayed set silica gel and 0.025 pore volume of fresh water. The silica gel is prepared by admixing 1 part by volume of sodium silicate solution, 2 parts by volume fresh water, and 3 parts by volume formalin. The sodium silicate solution is an aqueous commercial sodium silicate containing about 37.6 weight percent sodium silicate and having a silica to sodium oxide ($SiO_2/Na_2O$) ratio of 3.22 marketed by Philadelphia Quartz Company under the designation N-grade sodium silicate solution. Waterflooding is resumed with fresh water being used as the flooding medium, and is continued until the produced water/oil ratio becomes excessive. Oil recovery at the completion of the flooding operation, i.e., at a produced water/oil ratio of 15, is 59.0 volume percent of the original oil-in-place. Thus, the selective plugging treatment resulted in the recovery of an additional 16.5 volume percent of the original oil, which is equivalent to 28.6 volume percent of the residual oil remaining in the reservoir at the completion of the initial flooding operation.

The produced water/oil ratio is plotted as a function of oil recovery in FIG. 1, and the oil recoveries are summarized in Table 1.

EXAMPLE 2

This example illustrates the increase in oil recovery obtainable by the improved waterflooding method of this invention. The test employs a heterogeneous synthetic Aloxite core substantially identical to the core employed in Example 1.

The core is prepared by first saturating it with oilfield brine and then with the 39° API Illinois crude oil employed in Example 1. Oil saturation is 73.5 percent. The core is then flooded with brine until substantial water breakthrough is observed as evidenced by a sharp increase in the produced water/oil ratio. The produced oil and water are collected and measured as in Example 1. Oil recovery at a produced water/oil ratio of 15 is 41.8 volume percent of the original oil-in-place.

Next, the core is treated by sequentially injecting through the injection well 0.025 pore volume of fresh water, 0.025 pore volume of polymer solution, 0.025 pore volume of delayed set silica gel, and 0.025 pore volume of fresh water. The polymer solution is a 0.1 weight percent solution of a partially hydrolyzed polyacrylamide marketed by Dow Chemical Company under the trademark Pusher 700 in fresh water, and exhibits a Brookfield viscosity of 21.0 cp at 6 rpm with a UL adapter. The delayed set silica gel is the same as employed in Example 1. Waterflooding is resumed with fresh water being used as the flooding medium, and continued until the produced water/oil ratio becomes excessive. Oil recovery at the completion of the flooding operation, i.e., at a produced water/oil ratio of 15, is 71.0 volume percent of the original oil-in-place. Thus, the combined polymer solution and selective plugging treatment of this invention resulted in the recovery of an additional 29.2 volume percent of the original oil, which is equivalent to 50.3 volume percent of the residual oil remaining in the reservoir at the completion of the initial flooding operation.

The produced water/oil ratios are plotted as a function of oil recovery in FIG. 2, and the oil recoveries are summarized in Table 1. It is apparent from these tests that substantially more oil can be recovered from highly stratified heterogeneous formations by the method of this invention than by conventional selective plugging treatments.

TABLE 1

Comparison of Test Results

| | Example 1 | Example 2 |
|---|---|---|
| Oil recovered by initial waterflood, Vol. % of O-1-P | 42.5 | 41.8 |
| Total oil recovered, Vol. % of O-1-P | 59.0 | 71.0 |
| Additional oil recovered by treatment, Vol. % of O-1-P | 16.5 | 29.2 |
| Residual oil recovered, Vol. % of residual oil remaining at the conclusion of initial waterflood | 28.6 | 50.3 |

While the foregoing tests are indicative of the overall operability of the process, the particular volumes of treating agents employed are not necessarily exemplary of the volumes of treating agents employed in a commercial scale treatment under field conditions.

While particular embodiments of the invention have been described, it will be understood that the invention is not limited thereto since many modifications can be made and it is intended to include within the invention any such embodiments as fall within the scope of the claims.

The invention having been thus described, we claim:

1. In the method of recovering petroleum from a subterranean reservoir in which a flooding medium is injected into the reservoir through an injection well to displace oil towards one or more spaced production wells from which fluids are recovered, and wherein said flooding medium channels through relatively high permeability strata or channels in the reservoir causing a nonuniform flood front, the improvement which comprises injecting an aqueous solution of a mobility reducing water-soluble polymer through the injection well and into the reservoir in an amount sufficient to penetrate into the more permeable strata of the reservoir a substantial distance from the injection well, next injecting a liquid plugging agent that reacts in the reservoir to form a plugging material that at least partially plugs the more permeable strata adjacent to the injection well, and thereafter injecting said flooding medium.

2. The method defined in claim 1 wherein said aqueous polymer solution is injected in an amount sufficient to penetrate into the more permeable strata a distance of at least about 20 feet from the injection well.

3. The method defined in claim 1 wherein said liquid plugging agent is injected in an amount sufficient to penetrate into the more permeable strata a distance of not more than about 10 feet from the injection well.

4. The method defined in claim 1 wherein the setting time of said liquid plugging agent is delayed to permit placement of the agent in the reservoir prior to the plugging material being formed to any substantial degree.

5. A method for flooding a heterogeneous reservoir having strata or channels of relatively high permeability through which injected flooding media preferentially flow, which comprises:
   injecting an aqueous solution of a mobility reducing water-soluble polymer through an injection well in communication with said reservoir, said solution being injected in an amount sufficient to penetrate into the more permeable strata of the reservoir a distance of at least about 20 feet from the injection well;
   next injecting a liquid plugging agent that reacts in the reservoir to form a plugging material that at least partially plugs the more permeable strata adjacent to the injection well, said liquid plugging agent being injected in an amount sufficient to penetrate into the more permeable strata of the reservoirs a distance of not more than about 10 feet from the injection well; and
   thereafter injecting flooding media to displace oil towards one or more spaced production wells.

6. The method defined in claim 5 including the step of injecting a slug of fresh water immediately preceding said aqueous polymer solution.

7. The method defined in claim 5 including the step of injecting a slug of fresh water immediately following said liquid plugging agent.

8. The method defined in claim 5 wherein said aqueous polymer solution is injected in an amount equivalent to about 5 to 200 barrels per vertical foot of formation to be treated.

9. The method defined in claim 8 wherein said liquid plugging agent is injected in an amount equivalent to about 1 to 10 barrels of selective plugging agent per vertical foot of formation to be treated.

10. The method defined in claim 5 wherein said liquid plugging agent is an aqueous solution of sodium silicate and a gelling agent that causes the delayed gelation of said sodium silicate.

11. The method defined in claim 5 wherein the steps of injecting said aqueous solution of mobility reducing water-soluble polymer and said liquid plugging agent are subsequently repeated.

12. A method for reducing the permeability of a high permeability strata or channels in communication with a well, which comprises:
   injecting into said high permeability strata about 5 to 200 barrels per vertical foot of strata to be treated of an aqueous solution containing about 0.001 to 1 weight percent of a mobility reducing water-soluble polymer selected from the group consisting of relatively high molecular weight acrylic acid-acrylamide copolymer, acrylic acid-acrylamide-diacetone acrylamide terpolymer, partially hydrolyzed polyacrylamide, hydroxyethyl cellulose, carboxymethyl cellulose, polyacrylamide, polyoxyethylene, modified starch, heteropolysaccharide obtained by the fermentation of starch derived sugar, polyvinyl alcohol, polyvinyl pyrollidone and polystyrene sulfonate; and
   thereafter injecting into said strata about 1 to 10 barrels per vertical foot of strata to be treated of an aqueous sodium silicate solution containing a gelling agent selected from the group consisting of acid and acid forming compounds, water-soluble ammonium salts, lower aldehydes, aluminum salts, and alkali metal aluminates.

13. A method for flooding a heterogeneous reservoir having strata or channels of relatively high permeability through which injected flooding media preferentially flow, which comprises:

injecting through an injection well and into said reservoir about 1 to 10 barrels of fresh water per vertical foot of reservoir to be treated;

then injecting through said injection well an aqueous solution containing about 0.001 to 1 weight percent of a mobility reducing water-soluble polymer in an amount between about 5 and 200 barrels per vertical foot of reservoir to be treated sufficient to penetrate into the more permeable strata a distance of at least about 20 feet from the injection well;

next injecting through said injection well an aqueous solution containing about 1 to 30 weight percent of sodium silicate and a gelling agent selected from the group consisting of acid and acid forming compounds, water-soluble ammonium salts, lower aldehydes, aluminum salts and alkali metal aluminates in an amount between about 1 and 10 barrels per vertical foot of formation to be treated sufficient to penetrate into the more permeable strata of the reservoir a distance of not more than about 10 feet from the injection well;

next injecting through said injection well about 1 to 10 barrels of fresh water per vertical foot of reservoir to be treated; and thereafter injecting flooding media through said injection well to displace oil towards one or more spaced production wells.

14. The method defined in claim 13 wherein said polymer is relatively high molecular weight acrylic-acid-acrylamide copolymer, acrylic acid-acrylamide-diacetone acrylamide terpolymer, partially hydrolyzed polyacrylamide, hydroxyethyl cellulose, carboxymethyl cellulose, polyacrylamide, polyoxyethylene, modified starch, heteropolysaccharide obtained by the fermentation of starch derived sugar, polyvinyl alcohol, polyvinyl pyrollidone, and polystyrene sulfonate.

15. The method defined in claim 13 wherein the amount of aqueous polymer solution injected is sufficient to penetrate into the more permeable strata a distance of at least about 50 feet from the injection well.

16. The method defined in claim 13 wherein the amount of liquid plugging agent injected is sufficient to penetrate into the more permeable strata a distance of not more than about 5 feet from the injection well.

* * * * *